United States Patent Office 3,661,878
Patented May 9, 1972

3,661,878
PROCESS FOR PRODUCING ETHYLENE POLYMERS AND ETHYLENE COPOLYMERS
Itsuho Aishima, Tokyo, Hisaya Sakurai, and Yukichi Takashi, Kawasaki-shi, Hideo Morita and Yoshiyuki Hirotsu, Yokohama-shi, and Tetsuo Hamada, Kawasaki-shi, Japan, assignors to Asahi Chemical Industry Co., Ltd., Tokyo, Japan
No Drawing. Filed July 9, 1969, Ser. No. 840,475
Int. Cl. C08f 1/44, 3/06, 15/04
U.S. Cl. 260—88.2 F    7 Claims

ABSTRACT OF THE DISCLOSURE

The polymerization of ethylene and the copolymerization of ethylene with one alpha-olefin having 3 to 10 carbon atoms in the presence of a catalyst prepared by the reaction between (A) at least one compound of the general formula:

$$R^1R^2HSiOAlR^3R^4$$

wherein $R^1$ and $R^2$ represent independently members selected from the group consisting of alkyl groups having 1 to 5 carbon atoms, cyclohexyl, phenyl and 1-naphthyl; $R^3$ and $R^4$ represent independently members selected from the group consisting of alkyl groups having 1 to 5 carbon atoms, cyclobutyl, cyclopentyl, cyclohexyl, phenyl and p-tolyl and (B) at least one compound selected from the group consisting of (1) $TiX_p$, $VX_p$, $TiX_{4-q}(OR^5)_q$, $VOX_{3-r}(OR^5)_r$ and $VOX_3$ wherein X represents halogen selected from the group consisting of Cl, Br, and I; $R^5$ represents one member selected from the group consisting of alkyls having 1 to 6 carbon atoms, cyclohexyl, phenyl and p-tolyl; p is an integer of 2 to 4, q is an integer of 1 to 3; r is an integer of 1 to 2; and (2) The solid compounds obtained by the reaction between one member selected from the group consisting of $TiX_4$, $VX_4$, $TiX_{4-q}(OR^5)_q$, $VOX_{3-r}(OR^5)_r$ and $VOX_3$ and one member selected from the group consisting of $AlR_v^6(OR^7)_wX_{3-y}$, $SiR_3^8H$, $(R^9HSiO)_s$,

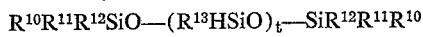

and a combination of one member selected from $SiR_3^8H$, $(R^9HSiO)_s$ and $R^{10}R^{11}R^{12}SiO—(R^{13}HSiO)_t—R^{12}R^{11}R^{10}$ and one member selected from $AlCl_3$, $AlBr_3$ and $FeCl_3$ wherein $R^5$ and X represent independently the same groups as defined above; $R^6$ and $R^7$ represent independently the same groups as above-defined $R^5$; $R^8$, $R^9$, $R^{10}$, $R^{11}$, $R^{12}$ and $R^{13}$ represent independently the same groups as above-defined $R^1$ or $R^2$; q and r represent independently the same integers as above-defined; v is an integer of 1 to 3, w is 0 or an integer of 1 to 2, y is an integer of 1 to 3 and $v+w+y=3$; s is an integer of 3 to 6; t is at least one and the viscosity of

is at most 2,000 ecntistokes, the mole ratio of the compound (A) to the compound (B) being 0.5–5:1.

This invention relates to the production of crystalline ethylene polymers and ethylene copolymers.

Heretofore, a variety of catalysts for polymerizing alpha-olefins have been proposed and each of the catalysts has its own characteristics.

For example, Japanese patent specification No. 282,694 describes a process for polymerizing ethylene, propylene or vinyl chloride using a catalyst prepared by treating a halide of transition metals such as $TiCl_4$, $TiCl_3$, $VCl_4$ and $CrCl_3$ or an alkoxide of transition metals with a silicon-containing compound having

group such as triethyl silane and methyl hydrogen silicone oil. In that process there is the formation of anomalous polymers and it is difficult to continuously operate the polymerization reaction. Further, the ethylene polymers according to that process have a low bulk density and a relatively high degree of branching and are not uniform in particle size.

It is an object of this invention to provide novel catalysts for the production of crystalline ethylene polymers and ethylene copolymers.

It is another object of this invention to provide a process for polymerizing ethylene or copolymerizing ethylene with one alpha-olefin having 3 to 10 carbon atoms by using said novel catalysts.

Other and additional objects of this invention will become apparent from a consideration of this entire specification including the claims hereof.

In accord with and fulfilling these objects, one aspect of this invention resides in a catalyst obtained by the reaction of (A) at least one compound containing silicon and aluminum represented by the formula:

$$R^1R^2HSiOAlR^3R^4$$

wherein $R^1$ and $R^2$ represent independently alkyls having 1 to 5 carbon atoms such as methyl, ethyl, normal propyl, isopropyl, normal butyl, isobutyl and normal pentyl, aryls such as phenyl and 1-naphthyl, and cycloalkyls such as cyclohexyl; $R^3$ and $R^4$ represent independently alkyls having 1 to 5 carbon atoms such as methyl, ethyl, normal propyl, isopropyl, normal butyl, isobutyl and normal pentyl, aryls such as phenyl and p-tolyl, cycloalkyls such as cyclobutyl, cyclopentyl and cyclohexyl and (B) at least one titanium or vanadium compound containing at least one halogen selected from;

(1) $TiX_p$, $VX_p$, $TiX_{4-q}(OR^5)_q$, $VOX_{3-r}(OR^5)_r$ and $VOX_3$ wherein X represents halogen such as Cl, Br, and I; $R^5$ represents alkyl having 1 to 6 carbon atoms such as methyl, ethyl, normal propyl, isopropyl, normal butyl, isobutyl, normal pentyl and normal hexyl, cycloalkyl such as cyclohexyl, and aryl such as phenyl and p-tolyl; p is an integer of 2 to 4, q is an integer of 1 to 3; r is an integer of 1 to 2; and (2) The solid compound obtained by the reaction of $TiX_4$, $VX_4$, $TiX_{4-q}(OR^5)_q$, $VOX_{3-r}(OR^5)_r$ or $VOX_3$ and $AlR_v^6(OR^7)_wX_{3-y}$, $SiR_3^8H$, $(R^9HSiO)_s$,

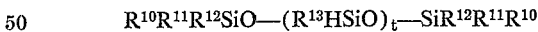

or a combination of one member selected from $SiR_3^8H$, $(R^9HSiO)_s$ and $R^{10}R^{11}R^{12}SiO—(R^{13}HSiO)_t—R^{12}R^{11}R^{10}$ and one member selected from $AlCl_3$, $AlBr_3$ and $FeCl_3$ wherein $R^5$ and X represent independently the same groups as defined above, $R^6$ and $R^7$ represent independently the same groups as above-defined $R^5$; $R^8$, $R^9$, $R^{10}$, $R^{11}$, $R^{12}$ and $R^{13}$ represent independently the same groups as above-defined $R^1$ or $R^2$; q and r represent independently the same integers as above-defined; v is an integer of 1 to 3, w is 0 or an integer of 1 to 2, y is an integer of 1 to 3 and $v+w+y=3$; s is an integer of 3 to 6; t is at least one and the viscosity of $R^{10}R^{11}R^{12}SiO—(R^{13}HSiO)_t—R^{12}R^{11}R^{10}$ is at most 2,000 centistokes, the mole ratio of (A) the compound containing silicon and aluminum to (B) the titanium or vanadium compound containing at least one halogen being 0.5–5:1.

It has now been found that by using such catalyst in the polymerization of ethylene, the polymers having a high bulk density may be produced and a series of the manufacturing steps such as polymerization, purification, separation, drying and pelletization may all be made small size and simplified. Additionally, the handling of such powdery polymers is easy since the particle size of polymers is relatively large and uniform and there is no danger of explosion due to fine powdery polymers and the melt-extruding step for pelletization is remarkably easy and accordingly a special device for feeding powdery polymers is not required. Further, a continuous operation of polymerization may be very easily effected since there is no formation of anomalous polymers such as the ones adhered to the wall of reactor or the bulky ones. Furthermore, only by selecting a combination of (A) the compound containing silicon and aluminum and (B) the titanium or vanadium compound containing at least one halogen even under the same polymerization conditions there may be easily produced a variety of polymers such as the ones having a high linearity for the production of containers and the ones having a comparatively high degree of branching to be used in an air molding.

Another aspect of this invention resides in the copolymerization of ethylene with one alpha-olefin having 3 to 10 carbons by using the catalyst above-mentioned.

According to this invention, examples of suitable compounds containing silicon and aluminum include $(CH_3)_2HSiOAl(CH_3)_2$ $(C_2H_5)_2HSiOAl(C_2H_5)_2$ $(n-C_3H_7)_2HSiOAl(n-C_3H_7)_2$ $(i-C_3H_7)_2HSiOAl(i-C_3H_7)_2$ $(n-C_4H_9)_2HSiOAl(n-C_4H_9)_2$ $(i-C_4H_9)_2HSiOAl(i-C_4H_9)_2$ $(CH_3)(C_2H_5)HSiOAl(C_2H_5)_2$ $(CH_3)(n-C_3H_7)HSiOAl(n-C_3H_7)_2$ $(CH_3)(i-C_3H_7)HSiOAl(i-C_3H_7)_2$ $(CH_3)(n-C_5H_{11})HSiOAl(C_2H_5)_2$ $(CH_3)(n-C_4H_9)HSiOAl(n-C_4H_9)_2$ $(CH_3)(i-C_4H_9)HSiOAl(i-C_4H_9)_2$ $(CH_3)(C_6H_5)HSiOAl(C_6H_5)_2$ $(C_2H_5)(i-C_4H_9)HSiOAl(C_2H_5)_2$ $(n-C_4H_9)_2HSiOAl(n-C_4H_9)(C_2H_5)$ $(i-C_4H_9)_2HSiOAl(n-C_3H_7)(cyclo\ C_6H_{11})$ $(CH_3)(C_2H_5)HSiOAl(C_2H_5)(i-C_4H_9)$ $(CH_3)n-C_5H_{11}HSiOAl(CH_3)(cyclo\ C_5H_9)$ $(CH_3)(1-C_{10}H_7)HSiOAl(C_2H_5)(p-CH_3C_6H_4)$ and $(CH_3)(cyclo\ C_6H_{11})HSiOAl(CH_3)(cyclo\ C_4H_7)$ These compounds are all stable novel compounds having a low vapor pressure and accordingly the present invention may be carried out.

These compounds are formed by the reaction:

(1) between $R^1R^2HSiOSiHR^1R^2$ and $AlR^{14}R^{15}R^{16}$;
(2) between $(R^9HSiO)_s$ or $R^{10}R^{11}R^{12}SiO—(R^{13}HSiO)_t—R^{12}R^{11}R^{10}$ and $AlR^{14}R^{15}R^{16}$; and
(3) between $R^1R^2HSiOH$ and $AlR^{14}R^{15}R^{16}$ wherein $R^1$, $R^2$ and $R^9$ represent independently the same groups as defined afore; $R^{14}$, $R^{15}$ and $R^{16}$ represent independently the same groups as aforedefined $R^3$ or $R^4$; $s$ and $t$ represent independently the same groups as defined afore.

These reactions may be effected in the presence or absence of a solvent such as a hydrocarbon at a temperature of room temperature to 210° C. in an inert atmosphere such as nitrogen.

The details of a process for preparing the compounds containing silicon and aluminum will be illustrated in the following.

According to the process (1), in a 500 ml. stainless steel reactor there are charged 26.8 g. of dimethyldihydrodisiloxane $[(CH_3)_2HSiOSiH(CH_3)_2]$ and 14.3 g. of $Al(CH_3)_3$ under a nitrogen atmosphere and the reactor is closed and left to stand at 200° C. for 20 hours. After the reaction is completed, the reactor is cooled to room temperature and the content of the reactor is distilled to remove the distillate having a low boiling point. Then the remaining substance is distilled under reduced pressure to give 9.2 g. of the main distillate. This distillate has a boiling point of 44° C. to 46° C. at 3 mm. Hg and is identified with $(CH_3)_2HSiOAl(CH_3)_2$ by the NMR spectrum analysis, the infra red absorption spectrum analysis and the elementary analysis.

According to the process (2), in a 500 ml. glass reactor equipped with a stirrer there are charged 28.0 g. of $Al(CH_3)_3$, 23.4 g. of cyclic methylhydropolysiloxane $[(CH_3)HSiO]_4$ and 200 ml. of n-heptane and the reaction is carried out at 40° C. for 24 hours in a nitrogen atmosphere. The reaction product is distilled under reduced pressure to give 39 g. of the main distillate. This distillate has a boiling point of 66° C. to 69° C. at 10 mm. Hg. This reaction quantitatively proceeds at a temperature of 40° C. to 50° C. in accordance with the following equations,

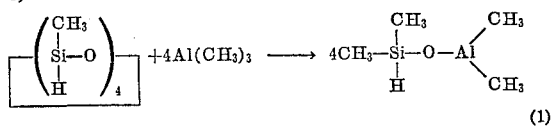

(1)

It is easily confirmed by the analysis of NMR spectrum of the reaction product what the structure of the reaction product is and whether the reaction has proceeded quantitatively. The results of the NMR spectrum analysis measured using a concentration of about 1 mole of the product per 1 l. of cyclopentane are shown in Table I.

TABLE I

| P.p.m. | Multiplicity (coupling constant) | Area ratio | Identification |
|---|---|---|---|
| 10.74 | 1 | 6.0 | Al—CH$_3$ |
| 9.71 | 1 2 | 6.2 | Si—CH$_3$ |
| 5.27 | 1 7 | 1 | Si—H |

[1] 3.0 cycles per second.

This Table I exhibits the presence of the bonds of two methyl groups and one hydrogen atom to silicon and two methyl groups to aluminum and the absence of the methylhydropolysiloxane and the free $Al(CH_3)_3$ in the unreacted state. Thus obtained compound the formula:

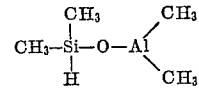

is soluble in hydrocarbon solvents and either the reaction solution as such may be employed as one component of the polymerization catalyst or the compound may be employed after being purified by distillation. They both exhibit the same behavior in the polymerization reaction. The presence of the silicon-hydrogen bond shown in the above-described formula is an indispensable structural factor and the compound in which the silicon-hydrogen bond is substituted with a hydrocarbon group such as methyl represented by the formula;

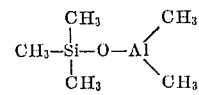

does not exhibit such a remarkable activity as the one of this invention when employed in the present invention.

According to the process (3), in a 500 ml. four-necked flask equipped with a dropping funnel containing 10.4 g. of $(C_2H_5)_2$ HSiOH and 100 ml. of hexane, a stirrer, a thermometer and a three-way cock, there are charged 11.4 g. of $(C_2H_5)_3Al$ and 100 ml. of hexane under a nitrogen atmosphere. The silanol solution is added dropwise to the triethyl aluminum solution over 30 minutes at 25° C. while agitating the reaction solution. The reaction proceeds accompanying an evolution of gas. After the dropping is completed, the hexane is removed under reduced pressure and the remaining solution is distilled under vacuum to give 13.2 g. of the reaction product. This product has a boiling point of 110° C. to 125° C. at 2 mm. Hg and is identified with $(C_2H_5)_7HSiOAl(C_2H_5)_2$ by the elementary analysis and the infra red absorption spectrum.

Examples of suitable titanium or vanadium compounds containing at least one halogen include $TiCl_4$, $TiCl_3$, $TiCl_2$, $VCl_4$, $VCl_3$, $VCl_2$, $TiBr_4$, $TiBr_3$, $TiBr_2$, $VBr_4$, $VBr_3$, $VBr_2$,
$TiI_4$, $TiI_3$, $TiI_2$, $VI_4$, $VI_3$, $VI_2$ $TiCl_3(OCH_3)$
$TiCl_3(OC_2H_5)$, $TiCl_3(O$ n-$C_4H_9)$, $TiCl_3(O$ n-$C_6H_{13})$
$TiCl_3(O$ cyclo $C_6H_{11})$, $TiCl_3(OC_6H_5)$
$TiCl_3(O$ p-$CH_3C_6H_4)$, $TiBr_3(OCH_3)$, $TiBr_3(OC_2H)$
$TiBr_3(O$ n-$C_2H_9)$, $TiI_2(OCH_3)$, $TiI_3(OC_2H_5)$
$TiI_3(O$ n-$C_3H)$, $TiI_3(O$-$C_3H_7)$, $TiI_3(O$ n-$C_4H_9)$
$TiCl_2(OCH_3)_2$, $TiCl_2(OC_2H_5)_2$, $TiCl_2(O$ n-$C_3H_7)_2$
$TiCl_2(O$ i-$C_3H_7)_2$, $TiCl_2(O$ n-$C_3H_9)_{,2}$ $TiCl_2(O$ i-$C_4H_9)_2$
$TiCl_2(O$ cyclo $C_6H_{11})_2$, $TiCl_2(O$ p-$CH_3C_6H_4)_2$
$TiI_2(OCH_3)_2$, $TiI_2(OC_2H_5)_2$, $TiI_2(O$ i-$C_4H_9)_2$
$TiCl(OCH_3)_3$, $TiCl(OC_2H_5)_3$, $TiCl(O$ n-$C_3H_7)_3$
$TiCl(O$ i-$C_3H_7)_3$, $TiCl(O$ n-$C_4H_9)_3$, $TiCl(O$ i-$C_4H_9)_3$
$TiCl(O$ n-$C_5H_{11})_3$, $TiCl(OC_6H_5)_3$, $TiI(O$ n-$C_3H_7)_3$
$TiI(O$ i-$C_3H_7)_3$, $VOCl_2$ $(OCH_3)$, $VOCl_2(OC_2H_5)$
$VOCl_2(O$ n-$C_3H_7)$, $VOCl_2(O$ i-$C_3H_7)$, $VOBr_2(O$ n-$C_3H_7)$
$VOBr_2(O$ i-$C_3H_7)$, $VOBr_2(O$ n-$C_4H_9)$, $VOBr_2(O$ i-$C_4H_9)$
$VOI_2(OCH_3)$, $VOI_2(OC_3H_5)$, $VOI_2(O$ n-$C_5H_{11})$
$VOI_2(O$ cyclo $C_6H_{11})$, $VOI_2(O$ n-$C_5H_{11})$, $VOCl(OCH_3)_2$
$VOCl(OC_2H_5)_2$, $VOCl(O$ n-$C_3H_7)_2$, $VOCl(O$ i-$C_3H_7)_2$
$VOBr(OCH_3)_2$, $VOBr(OC_2H_5)_2$, $VOBr(O$ i-$C_4H_9)_2$
$VOI(OCH_3)_2$, $VOI(OC_2H_5)_{,2}$ $VOCl_3$, $VOBr_3$ and $VOI_3$
and the solid compounds obtained by the reaction between one member selected from $TiCl_4$, $TiCl_2(O$ n-$C_4H_9)_2$, $VCl_4$ and $VOCl_3$ and one member selected from $Al(C_2H_5)_3$
$Al(C_2H_5)_2$, $AlCl_2(C_2H_5)$, $Al(OC_2H_5$ $(C_2H_5)_2$
$Al(i$-$C_4H_9)_3$, $(AlCl(i$-$C_4H_9)_2$, $(CH_3)_3SiH$, $(C_2H_5)_3SiH$
$[(CH_3)HSiO]_4$,$(CH_3)_3SiO$—$[(CH_3)HSiO]_{30}$—$Si(CH_3)_3$
and a combination of one member selected from
$(CH_3)_3SiH$, $(C_2H_5)_3SiH$, $[(CH_3)HSiO]_4$ and
$(CH_3)_3SiO$—$[(CH_3)HSiO]_{30}$—$Si(CH_3)_3$
and one member selected from $AlCl_3$, $AlBr_3$ and $FeCl_3$.

The reaction of these two catalyst components may be effected at temperatures of —70° C. to 100° C. in an inert reaction medium including aliphatic hydrocarbons such as n-hexane and n-heptane; aromatic hydrocarbons such as benzene, toluene and xylene; and alicyclic hydrocarbons such as cyclohexane and methyl cyclohexane. It is possible to add the two components of catalyst in the polymerization system and to react the two components of catalyst under the polymerization conditions in the course of polymerization reaction or to react the components of catalyst prior to the polymerization reaction. The mole ratio of the titanium or vanadium compound to the compound containing silicon and aluminum is preferably in the range of 1:0.5–5.0, and more preferably in the range of 1:0.5–2.0 to obtain a catalyst having a high activity.

The alpha-olefins having 3 to 10 carbon atoms which are copolymerizable with ethylene, include propylene, butene-1, 3-methylbutene-1, pentene-1, 4-methylpentene-1, hexene-1, heptene-1, octene-1, nonene-1 and decene-1.

According to the present invention, the ethylene copolymers contain at most 10 weight percent of the alpha-olefin.

In the production of the polymers and copolymers, polymerization may be conducted with or without a reaction medium, and the preferable reaction medium is an aliphatic, alicyclic or aromatic hydrocarbon inert to each of the catalyst components, such as, for example, butane n-hexane, isooctane, benzene, toluene, xylene, tetrahydronaphthalene, cyclohexane, methylcyclohexane and the like.

The ratio of such a solvent to ethylene or together wtih the alpha-olefin may arbitrarily be determined according to the mode of polymerization. Ordinarily, however, it is preferable to employ less than 100 parts by weight of the solvent per part by weight of ethylene or together with the alpha-olefin.

The catalyst is charged in a reactor together with a reaction medium and, for example, ethylene is induced thereto at a pressure of 1 to 20 kg./cm.$^2$ in an inert atmosphere. The polymerization is effected at a temperature of room temperature to 150° C. In order to control a molecular weight of, hydrogen gas, a halogenated hydrocarbon such as carbon tetrachloride and carbon tetraiodide or an organo-metallic compound capable of easily causing the chain transfer reaction such as diethyl zinc may be introduced or added to the reaction system. It is preferred to introduce hydrogen gas in proportion of at most 50 mole percent based upon the ethylene reactant or together with the alpha-olefin reactant.

This invention will be illustrated by the following examples which are in no way limiting upon the scope hereof. Viscosities are intrinsic viscosities measured using a concentration of 0.1 gram of the polymer per 100 cc. of tetralin at 135° C.

EXAMPLE 1

The first catalyst component of $(CH_3)_2HSiOAl(CH_3)_2$ was prepared as follows. In a 500 ml. glass reactor equipped with a stirrer 22.8 g. of $Al(CH_3)_3$, 19.0 g. of $[(CH_3)HSiO]_4$ and 200 ml. of cyclopentane were charged and reacted at 40° C. for 24 hours under a nitrogen atmosphere with stirring. The reaction product was colorless transparent liquid. The reaction proceeded quantitatively according to the Equation 1 described in the body of the specification. The reaction product shown in the above-described equation was a nearly pure compound and the unreacted reagent were not found from the NMR spectrum analysis of the reaction product. Accordingly, the reaction solution as such was used in the polymerization reaction.

0.72 g. of $TiCl_4$, 8 ml. of the resulting cyclopentane solution of $(CH_3)_2HSiOAl(CH_3)_2$ and 20 ml. of n-heptane were charged in a 50 ml. flask and stirred in a nitrogen atmosphere at room temperature for 30 minutes to prepare a catalyst. Then thus obtained catalyst was charged in a 2.0 l. autoclave which had been vacuumed and 1 l. of degassed and dehydrated n-heptane was added thereto. The autoclave was heated and ethylene was introduced thereto for 2 hours with stirring while maintaining the inner temperature of the autoclave at 80° C. and the inner pressure at 5 kg./cm.$^2$. After the polymerization was completed, isopropyl alcohol was added to decompose the catalyst and the polymers were filtered off and dried. There were obtained 403 g. of white powdery polymers having an intrinsic viscosity of 7.1 and a bulk density of 0.44. The distribution of the particle size of polymers was narrow and the polymers having a particle size of 0.15 to 0.2 mm. were 87 percent by weight and the formation of ribbon- or bulk-shaped polymers was not observed.

EXAMPLE 2

A compound containing silicon and aluminum represented by the formula $(CH_3)_2HSiOAl(CH_3)_2$ was prepared as follows. In a 1 l. glass reactor equipped with a stirrer, 45.6 g. of $Al(CH_3)_3$, 38.0 g. of $[(CH_3)HSiO]_4$ and 400 ml. of n-heptane were charged and reacted at 60° C. for 12 hours under a nitrogen atmosphere with stirring. After removing the n-heptane under reduced pressure, 83 g. of the reaction product were obtained. This product was identified with $(CH_3)_2HSiOAl(CH_3)_2$ by the NMR spectrum analysis. 6.0 g. of $TiCl_4$ and 8.0 g. of the resulting $(CH_3)_2HSiOAl(CH_3)_2$ were reacted in 160 ml. of n-heptane under a nitrogen atmosphere at room temperature for one hour. Then the resulting reaction mixture was charged in a 15 l. glass-lined autoclave with a stirrer and 8 l. of the sufficiently dehydrated paraffins. A hydrogen-ethylene mixture containing 0.35 mole percent of hydrogen was introduced thereto for 3.5 hours with stirring while maintaining the inner temperature of the autoclave at 80° C. and the inner pressure at 5 kg./cm.². After the polymerization was completed, methyl alcohol was added to decompose the catalyst and the polymers were filtered off and dried. There were obtained 3.9 kg. of white powdery polymers having an intrinsic viscosity of 1.20, a true density of 0.966 and a bulk density of 0.46. Neither adhesion of the polymers to the autoclave nor the formation of ribbon- or bulk-shaped polymers was observed. The distribution of the particle size of polymers was narrow and the polymers having a particle size of 0.15 to 0.2 mm. were 92 percent by weight. Furthermore, the melt-extrusion of thus obtained polymers by a pelletizer was operated efficiently and smoothly to give white pellets. As the result of the infra red spectrum analysis of the polymer the number of methyl groups in the polymer was 1.08 per 1,000 carbon atoms and the number of double bonds was 0.04 per 1,000 carbon atoms. As the result of measuring the distribution of molecular weight of the polymer according to the column fractionation method described in Macromol. Chem., vol. 20, p. 111, the ratio of the weight average molecular weight to the number average molecular weight was 4.2:1.

EXAMPLE 3

In the same manner as in Example 1 except that 1.1 g. of $(CH_3)_2HSiOAl(CH_3)_2$ prepared in the same manner as in Example 2, 1.1 g. of $TiCl_2(O\ n-C_4H_9)_2$ instead of $TiCl_4$ and a hydrogen-ethylene mixture containing 0.35 mole percent of hydrogen instead of ethylene were employed, the polymerization was carried out and 309 g. of white powdery polymers having an intrinsic viscosity of 1.09 a true density of 0.968 and a bulk density of 0.43.

EXAMPLE 4

A compound containing silicon and aluminum represented by the formula $(CH_3)(C_2H_5)HSiOAl(C_2H_5)_2$ was prepared as follows. In a glass pressure ampoule there were charged 22.5 g. of $Al(C_2H_5)_3$, 12 g. of methylhydropolysiloxane having a viscosity of 30 centistokes at 30° C. which terminals had been blocked with trimethylsilyl group and 100 ml. of n-heptane and the reaction was carried out at 120° C. for 24 hours. The reaction product was distilled under reduced pressure to give 24 g. of the main distillate having a boiling point of 131° C. to 133° C. at 6 mm. Hg. The results of the elementary analysis and the hydrolysis of the distillate are shown in Table II. This distillate was identified with

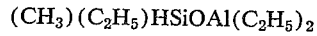

by the elementary analysis and the hydrolysis as well as the NMR spectrum analysis and the infra red absorption spectrum analysis.

TABLE II

| | Elementary analysis (percent by weight) | | | | Hydrolysis, amount¹ of evolved gas (ml./mmole) |
|---|---|---|---|---|---|
| | Si | Al | C | H | |
| Observed value | 16.2 | 15.3 | 49.7 | 11.6 | ²43.1 |
| Calculated value³ | 16.1 | 15.5 | 48.3 | 11.0 | 44.8 |

¹ Value at 0° C. at one atmospheric pressure.
² 98.2% of the evolved gas was ethane.
³ Value calculated for $(CH_3)(C_2H_5)HSiOAl(C_2H_5)_2$.

29 g. of the resulting $(CH_3)(C_2H_5)HSiOAl(C_2H_5)_2$ and 19 g. of $TiCl_4$ were added to 100 ml. of n-heptane and reacted at room temperature for 2 hours to give a reaction solution containing brown precipitates. The precipitates were filtered off in a nitrogen atmosphere and washed with 400 ml. of n-heptane. After removing off the solvent there were obtained 17 g. of solid substance.

1.0 g. of the resulting solid substance and 3.8 g. of

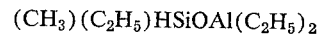

were charged in a 1.7 l. autoclave equipped with a stirrer and the autoclave was vacuumed. 800 ml. of n-heptane were inhaled in the autoclave and ethylene were introduced thereto for 2 hours with stirring while maintaining the inner temperature of the autoclave at 85° C. and the inner pressure at 3 kg./cm.². After the polymerization was completed, methyl alcohol was added to decompose the catalyst and there were obtained 372 g. of white powdery polymers of uniform particle size having an intrinsic viscosity of 6.13 and a bulk density of 0.45.

EXAMPLE 5

The catalyst was prepared as follows. 6.7 g. of $AlCl_3$, 22 ml. of methylhydropolysiloxane having a viscosity of 100 centistokes at 30° C. which terminals had been blocked with trimethylsilyl group and 13.4 ml. of $TiCl_4$ were added to 200 ml. of n-heptane and the reaction was carried out at 85° C. for 2 hours to give a reaction solution containing brown precipitates. These precipitates were filtered off using glass fibers in a nitrogen atmosphere, washed with 200 ml. of n-heptane, transferred to an Asahina-type extractor for a continuous operation, extracted and washed with n-heptane over 72 hours. After removing off the solvent under vacuum there were obtained 10.6 g. of solid product. The analytical results of thus obtained solid substance is shown in Table III.

TABLE III

| Element | Ti | | Si | Al | Cl | C | H |
|---|---|---|---|---|---|---|---|
| | Ti³⁺ | Ti⁴⁺ | | | | | |
| Observed value (percent by weight) | 22.7 | 2.5 | 6.5 | 0.4 | 55.5 | 5.3 | 1.1 |
| Atomic ratio | 0.91 | 0.09 | 0.44 | 0.03 | 2.96 | 2.02 | 6.17 |

Thus obtained brown solid product consists of complicated compounds or complexes containing titanium, silicon, aluminum, oxygen, chlorine, carbon and hydrogen. The compound containing silicon and aluminum represented by $(CH_3)_2HSiOAl(CH_3)_2$ was prepared in the same manner as in Example 2.

1.2 g. of the above-mentioned solid product and 2.5 g. of $(CH_3)_2SiOAl(CH_3)_2$ were charged in a 1.7 l. autoclave with a stirrer and the autoclave was vacuumed. 800 ml. of n-heptane were inhaled in the autoclave and a hydrogen-ethylene mixture containing 0.35 mole percent of hydrogen was introduced thereto for 2 hours with stirring while maintaining the inner temperature of the autoclave at 85° C. and the inner pressure at 3 kg./cm.². After the polymerization was completed, isopropyl alcohol was added to decompose the catalyst. There were obtained 407 g. of white powdery polymers having an intrinsic viscosity of 1.93, a true density of 0.958 and a bulk density of 0.44. The distribution of the particle size of polymers was very narrow and the polymers having a particle size of 0.15 to 0.2 mm. were 88 percent by weight and the formation of ribbon- or bulk-shaped polymers was not observed.

EXAMPLE 6

In the same manner as in Example 1, except that 1.0 g. of beta-$TiCl_3$ was used instead of $TiCl_4$ the polymerization was carried out and 360 g. of white powdery polymers of uniform particle size having an intrinsic viscosity of 4.46 and a bulk density of 0.46.

EXAMPLES 7 TO 15

A mixture of n-heptane and a comonomer set forth in Table II was prepared by mixig 1 l. of degassed n-heptane with 10 g. of the comonomer in the following manner. Gaseous propylene, butene-1 and 3-methylbutene-1 from a bomb were independently condensed in an autoclave cooled with Dry Ice. The other comonomers were independently weighed in a pressure ampoule at room temperature. 10 g. of thus obtained comonomer and 1 l. of n-heptane were placed in an autoclave which had been vacuumed, and the autoclave was shaken to produce a mixture of n-heptane and the comonomer.

In the same manner as in Example 1, the catalyst was introduced in an autoclave and the above-mentioned mixture of n-heptane and the comonomer instead of 1 l. of heptane was added thereto. Then the polymerization was carried out in the same manner as in Example 1 and the formation of ribbon- or bulk-shaped polymers was not observed. The results are shown in Table IV.

TABLE IV

| Example number | Comonomer | Polymer yield (gram) | Content of co-monomer [1] (percent by weight) | Bulk density | Intrinsic viscosity |
|---|---|---|---|---|---|
| 7 | Propylene | 372 | 2.2 | 0.43 | 3.1 |
| 8 | Butene-1 | 359 | 1.7 | 0.42 | 2.6 |
| 9 | 3-methylbutene-1 | 328 | 1.6 | 0.45 | 3.5 |
| 10 | Pentene-1 | 316 | 1.2 | 0.46 | 2.9 |
| 11 | 4-methylpentene-1 | 302 | 1.2 | 0.41 | 4.1 |
| 12 | Hexene-1 | 275 | 0.9 | 0.45 | 3.4 |
| 13 | Heptene-1 | 287 | 0.8 | 0.44 | 3.7 |
| 14 | Octene-1 | 261 | 0.6 | 0.46 | 3.9 |
| 15 | Decene-1 | 253 | 0.6 | 0.44 | 4.3 |

[1] The content of a comonomer was calculated from the absorption at 1,378 cm.$^{-1}$ of the infrared absorption spectrum.

EXAMPLES 16 TO 25

The polymerization of ethylene was carried out in the same way as in Example 3 except 4 mmoles of a variety of titanium or vanadium compounds and 8 mmoles of a variety of compounds containing silicon and aluminum set forth in Table V were employed. The results are shown in Table V. All polymers thus obtained had a uniform particle size.

TABLE V

| Example number | Titanium or vanadium compound | $R^1R^2HSiOAlR^3R^4$ | | | | Polymer yield (gram) | Intrinsic viscosity | Bulk density |
|---|---|---|---|---|---|---|---|---|
| | | $R^1$ | $R^2$ | $R^3$ | $R^4$ | | | |
| 16 | $TiCl_2(OCH_3)_2$ | $CH_3$ | $n-C_3H_7$ | $n-C_3H_7$ | $n-C_3H_7$ | 321 | 1.96 | 0.44 |
| 17 | $TiBr_3(OC_2H_5)$ | $CH_3$ | $i-C_3H_7$ | $i-C_3H_7$ | $i-C_3H_7$ | 346 | 2.33 | 0.43 |
| 18 | $TiI(O\ i-C_3H_7)_3$ | $n-C_4H_9$ | $n-C_4H_9$ | $n-C_4H_9$ | $C_2H_5$ | 313 | 2.51 | 0.48 |
| 19 | $VOCl_2(O\ n-C_3H_7)$ | $i-C_4H_9$ | $i-C_4H_9$ | $n-C_3H_7$ | Cyclo $C_6H_{11}$ | 276 | 1.84 | 0.46 |
| 20 | $VOBr(O\ i-C_4H_9)_2$ | $CH_3$ | $n-C_5H_{11}$ | $CH_3$ | Cyclo $C_5H_9$ | 292 | 1.65 | 0.45 |
| 21 | $VOI_2(O\ n-C_5H_{11})$ | $CH_3$ | $C_6H_5$ | $C_6H_5$ | $C_6H_5$ | 261 | 2.46 | 0.47 |
| 22 | $TiCl_3(O\ n-C_6H_{13})$ | $CH_3$ | $1-C_{10}H_7$ | $C_2H_5$ | $p-CH_3C_6H_4$ | 334 | 2.18 | 0.46 |
| 23 | $TiCl_3(O\ cyclo\ C_6H_{11})$ | $CH_3$ | Cyclo $C_6H_{11}$ | Cyclo $C_4H_7$ | | 361 | 2.35 | 0.44 |
| 24 | $TiCl_3(O\ C_6H_5)$ | $CH_3$ | $CH_3$ | $CH_3$ | $CH_3$ | 370 | 2.13 | 0.45 |
| 25 | $TiCl_3(O\ p-CH_3C_6H_4)$ | $CH_3$ | $C_2H_5$ | $C_2H_5$ | $C_2H_5$ | 358 | 2.72 | 0.49 |

EXAMPLE 26

In the same manner as in Example 1 except that 1.5 g. of $(C_2H_5)_2HSiOAl(C_2H_5)_2$ prepared according to the process (3) described in the body of the present specification were employed instead of $(CH_3)_2HSiOAl(CH_3)_2$, the polymerization was carried out and 379 g. of white powdery polymers of uniform particle size having an intrinsic viscosity of 8.2 and a bulk density of 0.44 resulted.

What is claimed is:

1. A process for producing an ethylene polymer which comprises polymerizing ethylene in the presence of a catalyst by the reaction between (A) at least one compound of the general formula $$R^1R^2HSiOAlR^3R^4$$

wherein $R^1$ and $R^2$ represent independently members selected from the group consisting of alkyl groups having 1 to 5 carbon atoms, cyclohexyl, phenyl and 1-naphthyl, $R^3$ and $R^4$ represent independently members selected from the group consisting of alkyl groups having 1 to 5 carbon atoms, cyclobutyl cyclopentyl, cyclohexyl, phenyl and p-tolyl and (B) at least one compound selected from the group consisting of (1) $TiX_p$, $VX_p$, $TiX_{4-q}(OR^5)_q$, $VOX_{3-r}(OR^5)_r$ and $VOX_3$ wherein X represents halogen selected from the group consisting of Cl, Br, and I; $R^5$ represents one member selected from the group consisting of alkyls having 1 to 6 carbon atoms, cyclohexyl, phenyl and p-tolyl; $p$ is an integer of 2 to 4, $q$ is an integer of 1 to 3; $r$ is an integer of 1 to 2; and (2) the solid compounds obtained by the reaction between one member selected from the group consisting of $TiX_4$, $VX_4$, $TiX_{4-q}(OR^5)_q$, $VOX_{3-r}(OR^5)_r$ and $VOX_3$ and one member selected from the group consisting of $AlR_v^6(OR^7)_wX_{-3-y}$, $SiR_3^8H$, $$(R^9HSiO)_s$$

$$R^{10}R^{11}R^{12}SiO-(R^{13}HSiO)_t-SiR^{12}R^{11}R^{10}$$ and a combination of one member selected from $SiR_3^8H$, $(R^9HSiO)_s$ and $R^{10}R^{11}R^{12}SiO-$ $$(R^{13}HSiO)_t-R^{12}R^{11}R^{10}$$

and one member selected from $AlCl_3$, $AlBr_3$ and $FeCl_3$ wherein $R^5$ and X represent independently the same groups as defined above, $R^6$ and $R^7$ represent independently the same groups as above-defined $R^5$; $R^8$, $R^9$, $R^{10}$, $R^{11}$, $R^{12}$ and $R^{13}$ represent independently the same groups as above-defined $R^1$ or $R^2$; $q$ and $r$ represent independently the same integers as above-defined; $v$ is an integer of 1 to 3, $w$ is 0 or an integer of 1 to 2, $y$ is an integer of 1 to 3 and $v+w+y=3$; $s$ is an integer of 3 to 6; $t$ is at least one and the viscosity of $R^{10}R^{11}R^{12}SiO-(R^{13}HSiO)_t-R^{12}R^{11}R^{10}$ is at most 2,000 centistokes, the mole ratio of the compound (A) to the compound (B) being 0.5–5:1.

2. A process according to claim 1, wherein the compound of the general formula $$R^1R^2HSiOAlR^3R^4$$

is selected from the group consisting of $(CH_3)_2HSiOAl(CH_3)_2$ $(C_2H_5)_2HSiOAl(C_2H_5)_2$, $(n-C_3H_7)_2HSiOAl(n-C_3H_7)_2$ $(i-C_3H_7)_2HSiOAl(i-C_3H_7)_2$, $(n-C_4H_9)_2HSiOAl(n-C_4H_9)_2$ $(i-C_4H_9)_2HSiOAl(i-C_4H_9)_2$ $(CH_3)(C_2H_5)HSiOAl(C_2H_5)_2$ $(CH_3)(n-C_3H_7)HSiOAl(n-C_3H_7)_2$ $(CH_3)(i-C_3H_7)HSiOAl(i-C_3H_7)_2$ $(CH_3)(n-C_5H_{11})HSiOAl(C_2H_5)_2$ $(CH_3)(n-C_4H_9)HSiOAl(n-C_4H_9)_2$ $(CH_3)(i-C_4H_9)HSiOAl(i-C_4H_9)_2$ $(CH_3)(C_6H_5)HSiOAl(C_6H_5)_2$ $(C_2H_5)(i-C_4H_9)HSiOAl(C_2H_5)_2$ $(n-C_4H_9)_2HSiOAl(n-C_4H_9)(C_2H_5)$ $(i-C_4H_9)_2HSiOAl(n-C_3H_7)(cyclo\ C_6H_{11})$ $(CH_3)(C_2H_5)HSiOAl(C_2H_5)(i-C_4H_9)$ $(CH_3)(n-C_5H_{11})HSiOAl(CH_3)(cyclo\ C_5H_9)$ $(CH_3)(i-C_{10}H_7)HSiOAl(C_2H_5)(p-CH_3C_6H_4)$ and $(CH_3)(cyclo\ C_6H_{11})HSiOAl(CH_3)(cyclo\ C_4H_7)$.

3. A process according to claim 1, wherein the compound of the formula $TiX_p$, $VX_p$, $TiX_{4-q}(OR^5)$, $VOX_{3-r}(OR^5)_r$ and $VOX_3$ is selected from the group consisting of $TiCl_4$, $TiCl_3$, $TiCl_2$, $VCl_4$, $VCl_3$, $VCl_2$, $TiBr_4$, $TiBr_3$, $TiBr_2$, $VBr_4$, $VBr_3$, $VBr_2$, $TiI_4$, $TiI_3$, $TiI_2$, $VI_4$, $VI_3$, $VI_2$, $TiCl_3(OCH_3)$, $TiCl_3(OC_2H_5)$, $TiCl_3(O\ n-C_4H_9)$, $TiCl_3(O\ n-C_6H_{13})$ $TiCl_3(O\ cyclo\ C_6H_{11})$, $TiCl_3(OC_6H_5)$ $TiCl_3(O\ p-CH_3C_6H_4)$, $TiBr_3(OCH_3)$, $TiBr_3(OC_2H_5)$ $TiBr_3(O\ n-C_2H_9)$, $TiI_3(OCH_3)$, $TiI_3(OC_2H_5)$ $TiI_3(O\ n-C_3H_7)$, $TiI_3(O\ i-C_3H_7)$, $TiI_3(O\ n-C_4H_9)$ $TiCl_2(OCH_3)_2$, $TiCl_2(OC_2H_5)_2$, $TiCl_2(O\ n-C_3H_7)_2$ $TiCl_2(O\ i-C_3H_7)_2$, $TiCl_2(O\ n-C_4H_9)_2$, $TiCl_2(O\ i-C_4H_9)_2$ $TiCl_2(O\ cyclo\ C_6H_{11})_2$, $TiCl_2(O\ p-CH_3C_6H_4)_2$ $TiI_2(OCH_3)_2$, $TiI_2(OC_2H_5)_2$, $TiI_2(O\ i-C_4H_9)_2$ $TiCl(OCH_3)_3$, $TiCl(OC_2H_5)_3$, $TiCl(O\ n-C_3H_7)_3$ $TiCl(O\ i-C_3H_7)_3$, $TiCl(O\ n-C_4H_9)_3$, $TiCl(O\ i-C_4H_9)_3$ $TiCl(O\ n-C_5H_{11})_3$, $TiCl(OC_6H_5)_3$, $TiI(O\ n-C_3H_7)_3$ $TiI(O\ i-C_3H_7)_3$, $VOCl_2(OCH_3)$, $VOCl_2(OC_2H_5)$ $VOCl_2(O\ n-C_3H_7)$, $VOCl_2(O\ i-C_3H_7)$, $VOBr_2(O\ n-C_3H_7)$, $VOBr_2(O\ i-C_3H_7)$ $VOBr_2(O\ n-C_4H_9)$, $VOBr_2(O\ i-C_4H_9)$ $VOI_2(OCH_3)$, $VOI_2(OC_2H_5)$, $VOI_2(O\ n-C_5H_{11})$ $VOI_2(O\ cyclo\ C_6H_{11})$, $VOI_2(O\ n-C_5H_{11})$ $VOCl(OCH_3)_2$, $VOCl(OC_2H_5)_2$, $VOCl(O\ n-C_3H_7)_2$ $VOCl(O\ i-C_3H_7)_2$, $VOB(OCH_3)_2$, $VOBr(OC_2H_5)_2$ $VOBr(O\ i-C_4H_9)_2$, $VOI(OCH_3)_2$, $VOI(OC_2H_5)_2$ $VOCl_3$, $VOBr_3$ and $VOI_3$.

4. A process according to claim 1, wherein the solid compound obtained by the reaction between one member selected from the group consisting of $TiX_4$, $VX_4$, $TiX_{4-q}(OR^5)_q$, $VOX_{3-r}(OR^5)_r$ and $VOX_3$ and one member selected from the group consisting of $AlR_v^6(OR^7)_wX_{-3-y}$, $SiR_3^8H$, $(R^9HSiO)_s$, $R^{10}R^{11}R^{12}SiO-(R^{13}HSiO)_t-SiR^{12}R^{11}R^{10}$ and a combination of one member selected from $SiR_3^8H$, $(R^9HSiO)_s$ and $R^{10}R^{11}R^{12}SiO-(R^{13}HSiO)_t-R^{12}R^{11}R^{10}$ and one member selected from $AlCl_3$, $AlBr_3$ and $FeCl_3$ is selected from the group consisting of the solid compounds obtained by the reaction between one member selected from the group consisting of $TiCl_4$, $TiCl_2(O\ n-C_4H_9)_2$ $VCl_4$ and $VOCl_3$ and one member selected from the group consisting of $Al(C_2H_5)_3$, $Al(C_2H_5)_2$, $AlCl_2(C_2H_5)$, $Al(OC_2H_5)(C_2H_5)_2$, $Al(i-C_4H_9)_3$, $AlCl(i-C_4H_9)_2$ $(CH_3)_3SiH$, $(C_2H_5)_3SiH$, $[(CH_3)HSiO]_4$ $(CH_3)_3SiO-[(CH_3)HSiO]_{30}-Si(CH_3)_3$ and a combination of one member selected from the group consisting of $(CH_3)_3SiH$, $(C_2H_5)_3SiH$, $[(CH_3)HSiO]_4$ and $(CH_3)_3SiO-[(CH_3)HSiO]_{30}-Si(CH_3)_3$ and one member selected from the group consisting of $AlCl_3$, $AlBr_3$ and $FeCl_3$.

5. A process according to claim 1, wherein the polymerization is conducted in the presence of at most 50 mole percent, based upon the ethylene reactant, of hydrogen.

6. A process for producing an ethylene copolymer containing at most 10 weight percent of one alpha-olefin having 3 to 10 carbon atoms which comprises copolymerizing ethylene and said alpha-olefin in the presence of a catalyst prepared by the reaction between (A) at least one compound of the general formula:

$R^1R^2HSiOAlR^3R^4$ wherein $R^1$ and $R^2$ represent independently members selected from the group consisting of alkyl groups having 1 to 5 carbon atoms, cyclohexyl, phenyl and 1-naphthyl; $R^3$ and $R^4$ represent independently members selected from the group consisting of alkyl groups having 1 to 5 carbon atoms, cyclobutyl, cyclopentyl, cyclohexyl, phenyl and p-tolyl and (B) at least one compound selected from the group consisting of (1) $TiX_p$, $VX_p$, $TiX_{4-q}(OR^5)_q$, $VOX_{3-r}(OR^5)_r$ and $VOX_3$ wherein X represents halogen such as Cl, Br, and I; $R^5$ represents one member selected from the group consisting of alkyls having 1 to 6 carbon atoms cyclohexyl, phenyl and p-tolyl; $p$ is an integer of 2 to 4, $q$ is an integer of 1 to 3; $r$ is an integer of 1 to 2; and (2) the solid compounds obtained by the reaction between one member selected from the group consisting of $TiX_4$, $VX_4$, $TiX_{4-q}(OR^5)_q$, $VOX_{3-r}(OR^5)_r$ and $VOX_3$ and one member selected from the group consisting of $AlR_v^6(OR^7)_wX_{3-y}$, $SiR_3^8H$, $(R^9HSiO)_s$, $R^{10}R^{11}R^{12}SiO-(R^{13}HSiO)_t-SiR^{12}R^{11}R^{10}$ and a combination of one member selected from $SiR_3^8H$, $(R^9HSiO)_s$ and $R^{10}R^{11}R^{12}SiO-(R^{13}HSiO)_t-R^{12}R^{11}R^{10}$ and one member selected from $AlCl_3$, $AlBr_3$ and $FeCl_3$ wherein $R^5$ and X represent independently the same groups as defined above; $R^6$ and $R^7$ represent independently the same groups as above-defined $R^5$; $R^8$, $R^9$, $R^{10}$, $R^{11}$, $R^{12}$ and $R^{13}$ represent independently the same groups as above-defined $R^1$ or $R^2$; $q$ and $r$ represent independently the same integers as above-defined; $v$ is an integer of 1 to 3, $w$ is 0 or an integer of 1 to 2, $y$ is an integer of 1 to 3 and $v+w+y=3$; $s$ is an integer of 3 to 6; $t$ is at least one and the viscosity of $R^{10}R^{11}R^{12}SiO-(R^{13}HSiO)_t-R^{12}R^{11}R^{10}$ is at most 2,000 centistokes, the mole ratio of the compound (A) to the compound (B) being 0.5–5:1.

7. A process according to claim 6, wherein said alpha-olefin is one member selected from the group consisting of propylene, butene-1, 3-methylbutene-1, pentene-1, 4-methylpentene-1, hexene-1, heptene-1, octene-1, nonene-1 and decene-1.

References Cited

UNITED STATES PATENTS 3,202,617   8/1965   Enk et al. _____ 260—94.9 X E

FOREIGN PATENTS 906,425   9/1962   Great Britain _____ 252—429

JOSEPH L. SCHOFER, Primary Examiner

A. HOLLER, Assistant Examiner

U.S. Cl. X.R.

252—429 B; 260—88.2 R, 94.9 C, 94.9 E

UNITED STATES PATENT OFFICE
CERTIFICATE OF CORRECTION

Patent No. 3,661,878        Dated May 9, 1972

Inventor(s) Itsuho Aishima et al

It is certified that error appears in the above-identified patent and that said Letters Patent are hereby corrected as shown below:

<u>Col. 1, between lines 9 and 10</u>

Insert -- Claims priority, application Japan,

July 16, 1968 Serial No. 49,654 --.

<u>Col. 1, line 57</u>

"ecntistokes" should be -- centistokes --.

<u>Col. 3, line 48</u>

"$(CH_3)$ n-$C_5H_{11}$)" should be -- $(CH_3)$ (n-$C_5H_{11}$) --.

<u>Col. 3, line 55</u> after "carried out" insert -- safely --.

<u>Col. 5, line 10</u>

"$(C_2H_5)_7$" should be -- $(C_2H_5)_2$ --.

<u>Col. 5, line 18</u>

"$(OC_2H)$" should be -- $(OC_2H_5)$ --.

<u>Col. 5, line 20</u>

"$(O_n-C_3H)$" should be -- $(O_n-C_3H_7)$ --.

UNITED STATES PATENT OFFICE
CERTIFICATE OF CORRECTION

Patent No. 3,661,878                    Dated May 9, 1972

Inventor(s) Itsuho Aishima et al                           —2—

It is certified that error appears in the above-identified patent and that said Letters Patent are hereby corrected as shown below:

<u>Col. 5, line 20</u>

"$(O-C_3H_7)$" should be -- $(O-_iC_3H_7)$ --.

<u>Col. 5, line 22</u>

"$(O_n-C_3H_9)_2 TiCl_3$" should be -- $(O_n-C_4H_9)_2, TiCl_2$ --.

<u>Col. 5, line 31</u>

"$(OC_3H_5)$" should be -- $(OC_2H_5)$ --.

<u>Col. 5, line 39</u>

"$(OC_2H_5$" should be -- $(OC_2H_5)$ --.

<u>Col. 5, line 40</u>

"$(AlCl$" should be -- $AlCl$ --.

Signed and sealed this 12th day of December 1972.

(SEAL)
Attest:

EDWARD M. FLETCHER, JR.
Attesting Officer

ROBERT GOTTSCHALK
Commissioner of Patents